(12) United States Patent
Amar et al.

(10) Patent No.: US 10,176,275 B1
(45) Date of Patent: Jan. 8, 2019

(54) BREAST SHAPE VISUALIZATION AND MODELING TOOL

(71) Applicants: Sharon Amar, North Potomac, MD (US); Kevin McNeely, Bethesda, MD (US)

(72) Inventors: Sharon Amar, North Potomac, MD (US); Kevin McNeely, Bethesda, MD (US)

(73) Assignee: LUVLYU, INC., North Potomac, MD (US)

( * ) Notice: Subject to any disclaimer, the term of this patent is extended or adjusted under 35 U.S.C. 154(b) by 169 days.

(21) Appl. No.: 15/082,489

(22) Filed: Mar. 28, 2016

(51) Int. Cl.
| | |
|---|---|
| *G06F 17/50* | (2006.01) |
| *G05B 19/4099* | (2006.01) |
| *B29C 67/00* | (2017.01) |
| *B33Y 80/00* | (2015.01) |
| *B33Y 50/02* | (2015.01) |
| *B29L 31/00* | (2006.01) |
| *B33Y 10/00* | (2015.01) |

(52) U.S. Cl.
CPC .......... *G06F 17/50* (2013.01); *B29C 67/0088* (2013.01); *B33Y 80/00* (2014.12); *G05B 19/4099* (2013.01); *B29L 2031/7532* (2013.01); *B33Y 10/00* (2014.12); *B33Y 50/02* (2014.12); *G05B 2219/35134* (2013.01); *G05B 2219/49007* (2013.01); *G06F 2217/12* (2013.01)

(58) Field of Classification Search
CPC ................................. G05B 15/02; B33Y 50/02
See application file for complete search history.

(56) References Cited

U.S. PATENT DOCUMENTS

| | | | | |
|---|---|---|---|---|
| 2009/0137894 A1* | 5/2009 | Olson | ...................... | A41H 1/02 600/407 |
| 2012/0236117 A1* | 9/2012 | Quadling | ................ | G06T 15/04 348/45 |
| 2014/0028799 A1* | 1/2014 | Kuffner | .................. | G01B 11/24 348/46 |
| 2014/0125775 A1* | 5/2014 | Holz | .................. | H04N 13/0217 348/49 |
| 2015/0228086 A1* | 8/2015 | Maurer | ................ | G06K 9/6202 382/100 |
| 2016/0005106 A1* | 1/2016 | Giraldez | ............. | G06F 19/3437 705/14.73 |
| 2016/0062152 A1* | 3/2016 | Fonte | ................. | G06Q 30/0621 351/204 |
| 2016/0284116 A1* | 9/2016 | Crain | .................... | H04N 5/2252 |
| 2016/0310064 A1* | 10/2016 | Cheng | .................... | A61B 5/1116 |
| 2017/0046833 A1* | 2/2017 | Lurie | ....................... | G06T 19/20 |
| 2017/0111632 A1* | 4/2017 | Thirion | .............. | H04N 13/0217 |
| 2017/0119471 A1* | 5/2017 | Winner | .................. | A61B 34/10 |
| 2017/0281367 A1* | 10/2017 | Ketchum | .................. | A61F 2/52 |

* cited by examiner

*Primary Examiner* — Vincent H Tran (74) *Attorney, Agent, or Firm* — Browdy and Neimark, P.L.L.C.

(57) ABSTRACT

A method of making a breast pad that includes enhancing a bust size of a three dimensional (3D) image of a user that illustrates a current body shape, comparing the enhanced 3D image to the current body shape 3D image and measuring the change in bust size of the enhanced 3D image with the 3D image of the current body shape of the user to produce a 3D image of a breast pad.

17 Claims, 8 Drawing Sheets

FIG. 1

Before – Size A

After – Size B
Implant Size 220 cc

FIG. 4

After – Size C
Implant Size 420 cc

BREAST SHAPE VISUALIZATION AND MODELING TOOL

TECHNICAL FIELD

The present invention relates generally to cosmetic appeal and/or reconstructive surgery. In particular, the present invention relates to improved modelling of breast pads.

BACKGROUND

Cosmetic or reconstructive surgery can come with significant uncertainties. For example, if a woman desires a breast augmentation, she may consult a cosmetic surgeon to view before and after photos and/or to get a feel for how large the implants will be. Based on this consultation, a woman may choose a new size and look. However, this may not provide a complete understanding of how the selected breast implants will actually look and feel. In some cases, women who are unhappy with the results of the procedure end up getting further revisions to change the size of the breast implant.

The system and apparatus of this invention allow a user to evaluate various cosmetic and reconstructive surgical procedures by viewing and trying on a three dimensional model of what the breast augmentation will look and feel like. As another feature, breast pads may be created that are worn under a bra for aesthetic purposes.

Alternatively, the breast pads may be worn and used simply for aesthetic appeal.

SUMMARY

The visualization and modeling system utilizes a series of images to develop a three dimensional (3D) image of an upper torso while maintaining the camera or imaging device in a stationary or fixed position. This is performed by changing the direction of light for each of the images and detecting changes in lighting patterns and/or reflections. Once the 3D model is completed, it can be manipulated to, for example, to simulate a larger breast size or to increase the amount of lift. This result can be saved as a second 3D model. Comparison of the before and after 3D models yields a difference in volume. The difference in volume can be printed on a three dimensional printer to produce a breast pad. The breast pad can be worn over the breast to model a simulated result of the cosmetic surgery. In another embodiment, the breast pads are worn inside a brassiere for aesthetic purposes.

In one general aspect, a method of making a breast pad, includes enhancing a bust size of a three dimensional (3D) image of a user that illustrates a current body shape, comparing the enhanced 3D image to the current body shape 3D image and measuring the dimension/volume difference between the bust size of the enhanced 3D image to the current body shape 3D image to produce a 3D image of a breast pad.

Embodiments may include one or more of the following features. For example, the method may include printing the 3D image of the breast pad on a 3D printer. As another feature, the user may be prompted to take the current body shape 3D image. As another feature, the current body shape 3D image may be taken with a single mobile device that provides illumination from different angles emanating from a display of the device.

The user may include an object of known size and color in the 3D image of the current body shape. Thus, actual dimensions of the 3D image may be known based on calibration from the object of known size. Since the object has a known size, the algorithm can account for variations in how the camera is held and positioned to get a more accurate 3D breast volume image.

Since the object also can have one or more known colors, it can be used for calibration purposes to get an accurate skin tone or color of the user's skin. Thus, a 3D image of the breast pad may be printed with an accurate the skin color of the user.

DETAILED DESCRIPTION

Figure 1:
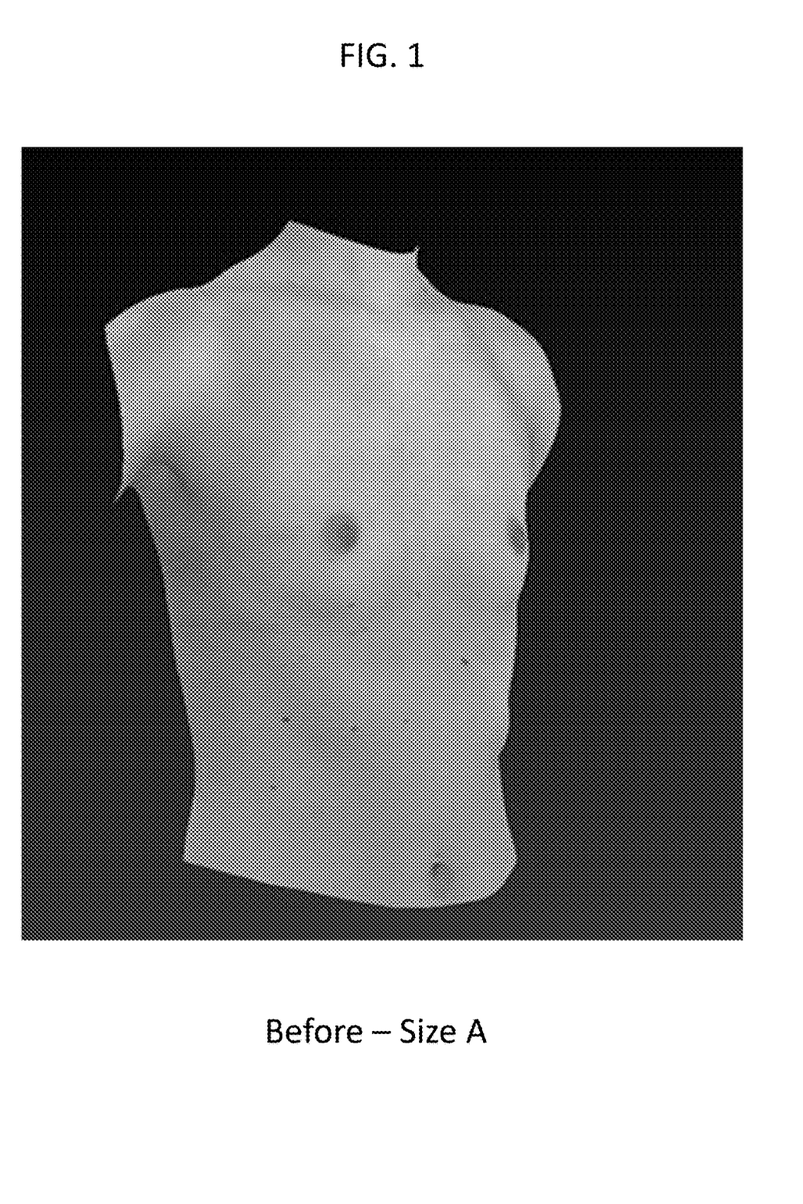
FIG. 1 is a 3D model of a user.

Referring to FIG. 1, a user can take a three dimensional (3D) image of a front portion of the torso. In one embodiment, a 3D software application is downloaded to a portable electronic device, such as, for example, a tablet personal computer or a smartphone, which is used as a 3D scanner or imaging device.

The 3D application takes a series of images with lighting provided from several different positions from the display panel of the portable device while the portable device remains in a stationary or fixed position. For example, light can be projected from upper, lower, left and right quadrants of the display panel while capturing a series of four images.

In the example of FIG. 1, the user has a breast cup size A. In order to ensure privacy, the 3D image can be converted to a grid pattern and/or a series of measurements. The scanned image can be stored on the device or e-mailed to another device.

Figure 2:
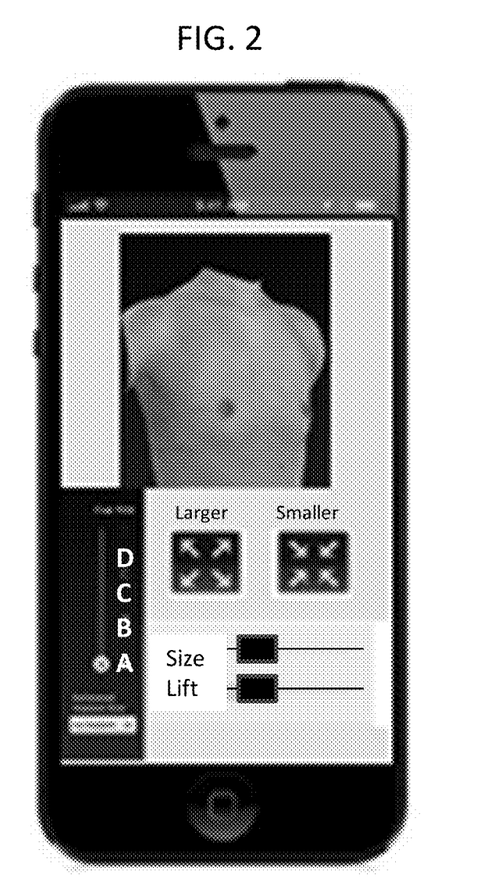
FIG. 2 shows an editor application on a mobile device.

Referring to FIG. 2, the user opens another software application and imports the 3D image into an editor of the application. The editor has a variety of tools available to alter breast appearance. For example, the user can slide a control from breast sizes A, B, C or D. The user can also define an area on the screen and use the larger or smaller buttons to increase or decrease the size of the defined area. As another editing feature, the user can separately adjust lift and size.

Figure 3:
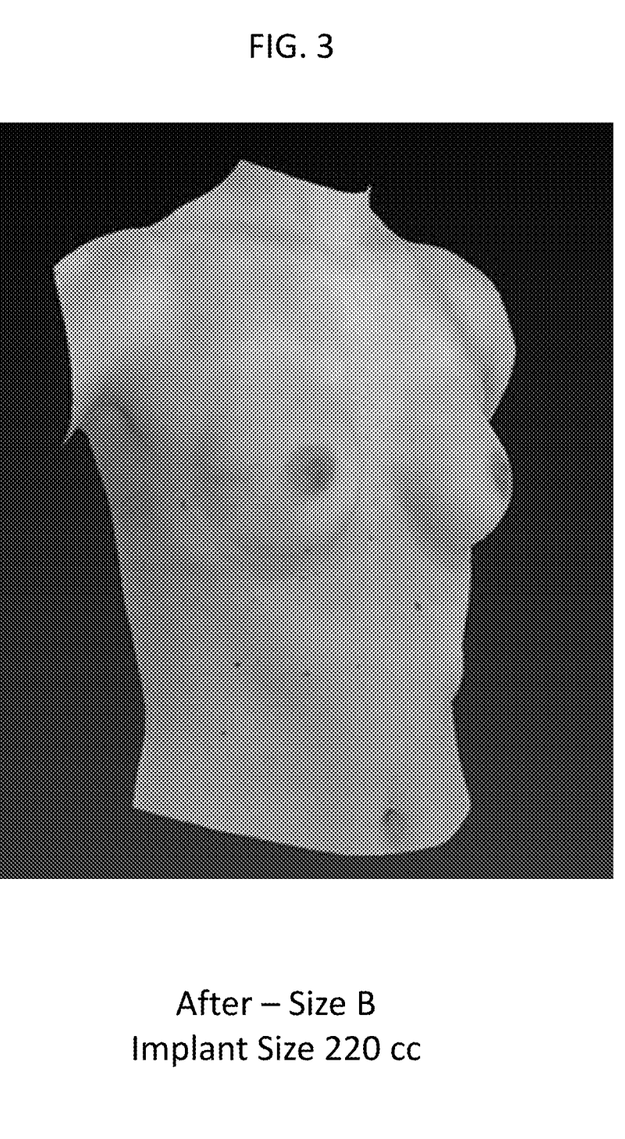
FIGS. 3 and 4 are three dimensional images of a user with enhanced breast sizes.
Figure 4:
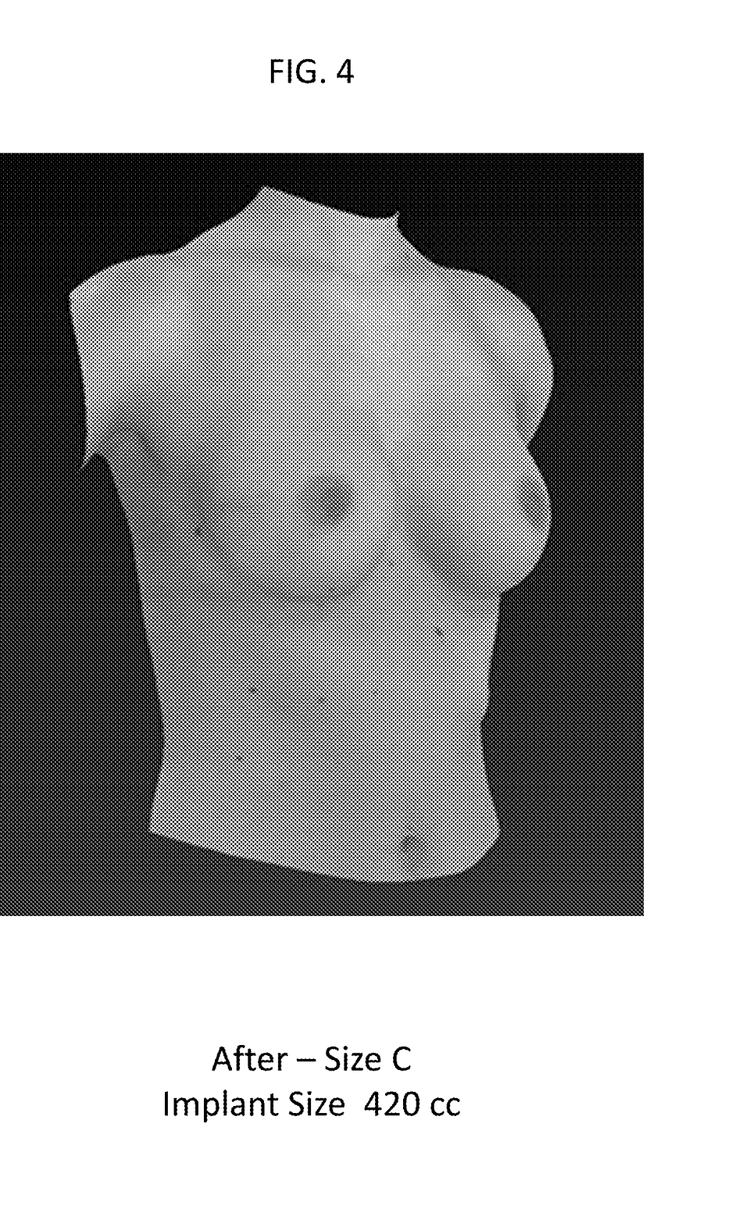

Referring to FIGS. 3 and 4, the user manipulates the editing controls to product 3d images with size B and C breasts, respectively. The application calculates the change in volume from the original image to be an addition of 220 and 420 cubic centimeters of volume, respectively.

At this point, the user has various virtual display options. For example, the user has tools to see what the image looks like in swimwear, a gown, a business suit or other clothing.

Figure 5A:
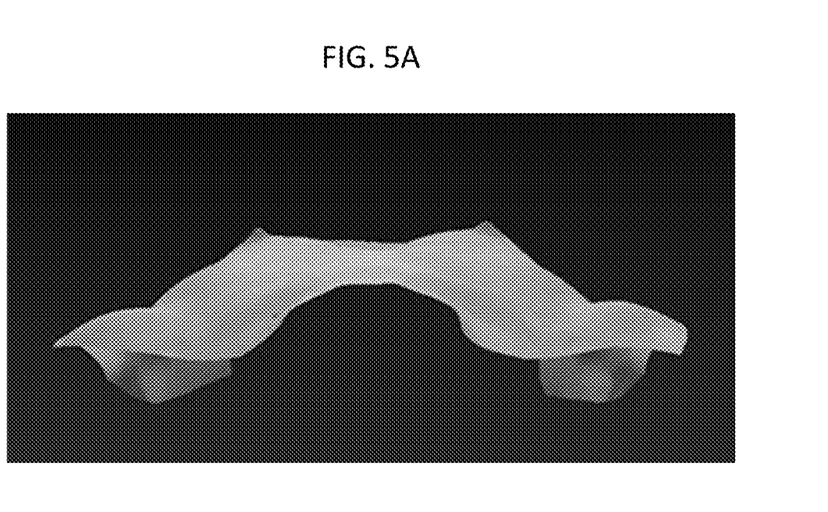
FIGS. 5A and 5B show original and enhanced 3D images.
Figure 5B:
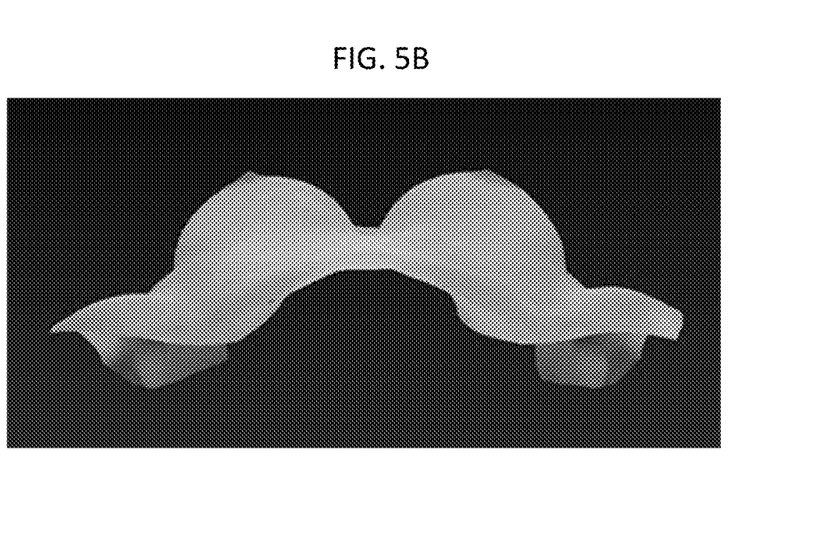

Referring to FIGS. 5A and 5B, the user selects one of the enhanced images for comparison to the original (before look). The image can be rotated for different views.

The user can export a stereo lithography (STL) file of the 3D image to a 3D printer. The image of the enhanced breast size can be printed and essentially worn as a mask to try on the new enhanced breast size.

Figure 6:
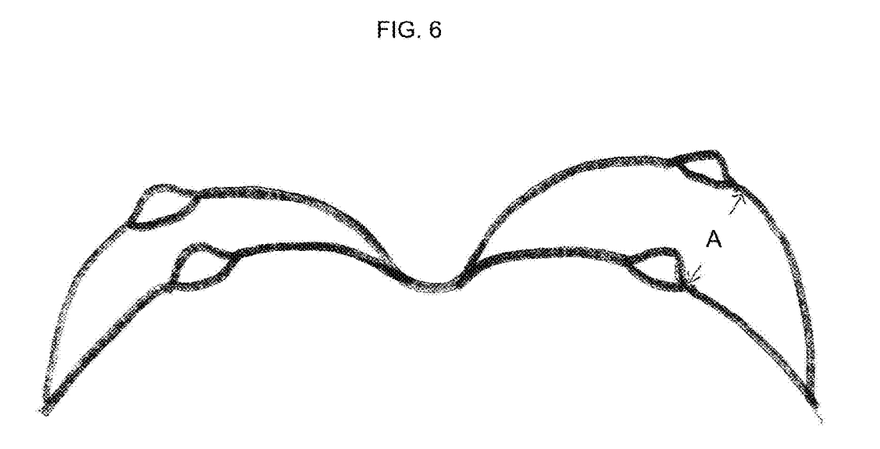
FIG. 6 shows size differences of the two busts.

Referring to FIG. 6, another alternative is to compare the volume of the original 3D scan and the enhanced 3D scan and measure the different dimensions and volumes to produce a breast pad that fits the natural contours of the user's body but increases the bust to the desired size.

Figure 7A:
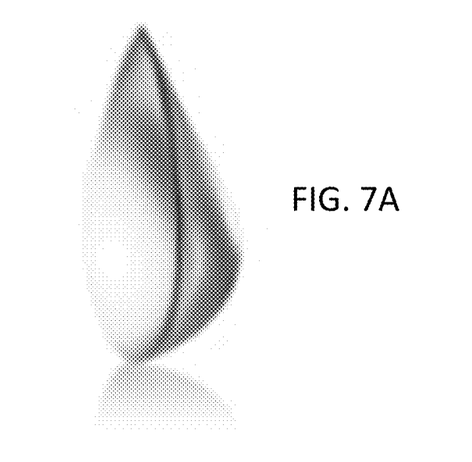
FIGS. 7A and 7B show breast pads or cups printed from a 3D printer.
Figure 7B:
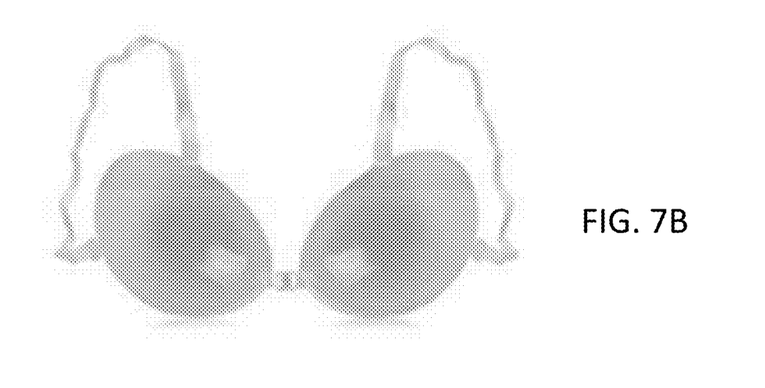

FIGS. 7A and 7B show two embodiments of the bust pads printed on a 3D printer. FIG. 7A shows an individual bust pad that can be worn over the user's breast. The breast pad can also be designed so that it cannot be seen beneath a bra. Thus, the user can wear the breast pad under various clothing items. FIG. 7 B shows the breast pads worn as cups in a bra-like device. The 3D breast pads can be printed with tabs or slots to attach the straps.

Figure 8:
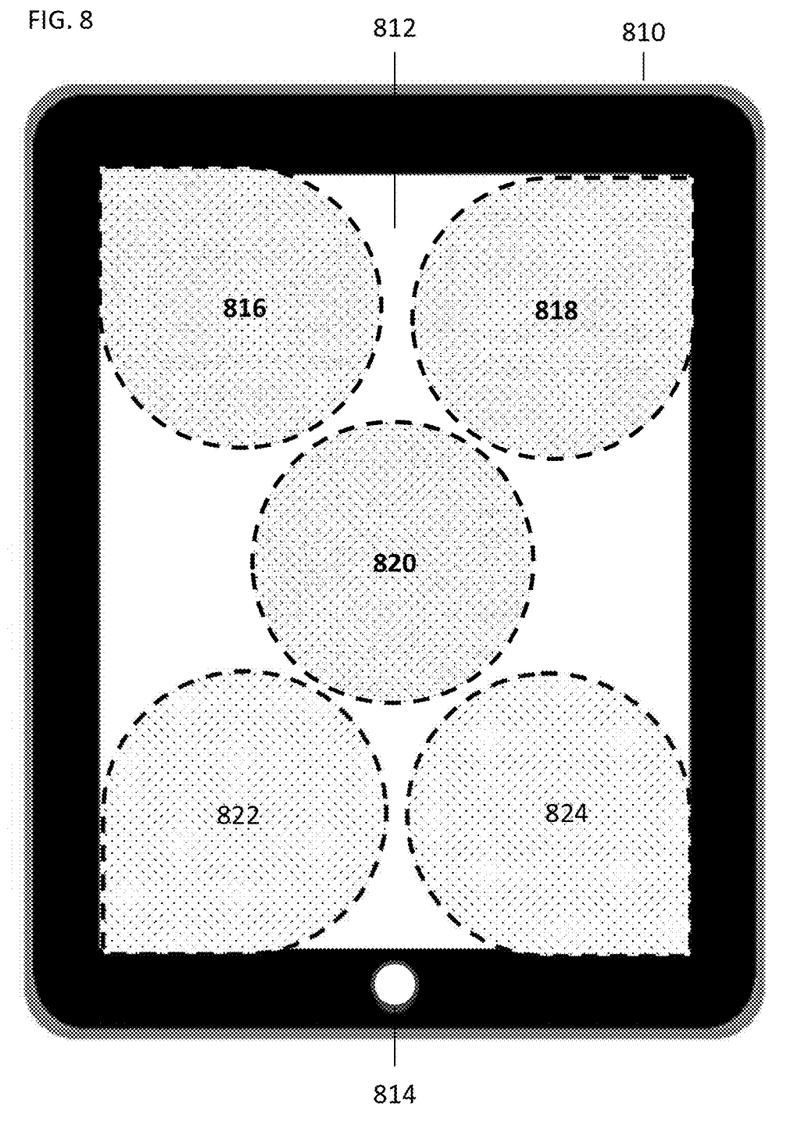
FIG. 8 shows a display screen of a mobile device.

Referring to FIG. 8, a mobile device 810 includes a display screen 812 and a camera lens 814. Illumination from the display screen 812 can be providing from different positions, such as, for example, top left 816, top right 818, center 820, bottom left 822 and bottom right 824. While a series of images are taken by the camera, the lighting position can be varies for each image. The images can be compared to detect changes in light patterns in order to produce a 3D image of the front half of an object.

The mobile device may be, for example, a smartphone or a tablet personal computer (PC). The smartphone hardware architecture may include memory (DRAM), a processor, an operating system and application software. A transmitter/receiver may be used with a SIM card for mobile communications and the device may also have WiFi and Bluetooth connectivity. The device may have a global positioning system, display, touchscreen, keyboard, microphone, and speaker.

The invention claimed is:

1. A method of making a breast pad that can be worn on a user's upper torso with a mobile device having a camera and a display screen, the method comprising:
   capturing a series of images of the upper torso of the user with the camera;
   illuminating different portions of the display screen for each of the series of images;
   detecting changes in light patterns and/or reflections between each of the series of images;
   producing a three dimensional (3D) upper torso image of the user from the detected changes;
   enhancing a bust size of the 3D upper torso to produce an enhanced 3D image;
   comparing the enhanced 3D image to the 3D upper torso image;
   producing a 3D image of the breast pad based on the comparison of the enhanced 3D image and the 3D upper torso image, wherein the breast pad comprises a mask fitted to the user's body, the mask comprising
      a volume based on a difference between the enhanced 3D image and the 3D upper torso image;
      an inner surface that conforms to the natural contours of the user's body; and
      an outer surface that conforms to the contours of the enhanced 3D image; and printing the mask with a 3D printer.

2. The method of claim 1, further comprising:
prompting the user to capture the series of images.

3. The method of claim 1, further comprising prompting the user to hold the mobile device at a fixed position when the user takes the series of images.

4. The method of claim 1, further comprising:
prompting the user to include an object of known size in the series of images; and
calculating actual dimensions of the 3D upper torso with calibration based on the object of the known size.

5. The method of claim 1, further comprising:
producing the 3D upper torso with actual dimensions based on reference to a calibration measurement.

6. The method of claim 1, further comprising:
prompting the user to include an object having a known color in the series of images;
comparing the color of the object to the 3D upper torso; and
determining a skin tone of the 3D upper torso based on the comparison with the object.

7. The method of claim 6, wherein the object having a known color includes more than one color.

8. The method of claim 1, further comprising:
determining the skin tone of the upper torso of the user; and
printing the 3D image of the mask on a 3D printer with the skin tone of the upper torso of the user.

9. The method of claim 1, further comprising:
identifying a breast portion of the 3D upper torso.

10. The method of claim 1, further comprising:
inserting the mask in a bra-like device to be worn by the user.

11. The method of claim 1, wherein printing the mask with the 3D printer further comprises printing the mask with tabs and/or slots to receive attachment straps.

12. The method of claim 11, further comprising:
attaching the attachment straps to the tabs and/or slots for the mask to be worn on the chest of the user.

13. A device, comprising:
a camera to capture a series of images of a trunk of a user;
a display screen to illuminate the trunk of the user from different positions for each of the series of images;
a detection unit to detect changes in light patterns between each of the series of images;
a processor to produce a three dimensional (3D) image of the trunk of the user based on the detected changes in light patterns;
an input device to allow the user to enhance a bust size of the 3D image on the display screen; and
a comparison unit to compare the enhanced 3d image to the image of the trunk of the user;
wherein
the processor produces a 3D image of a mask to fit over a chest of the user, the mask comprising
a volume based on a difference in dimensions between the enhanced 3D image and the image of the trunk of the user;
an inner surface that conforms to the natural contours of the user's body; and
an outer surface that conforms to the contours of the enhanced 3D image.

14. The device of claim 13, further comprising:
a bra-like device to receive more than one breast cup to be worn by the user.

15. A method of making a mask fitted to a chest of a user with a mobile device having a camera and a display screen, the method comprising:
capturing more than one image of an upper torso of the user with the camera held in a stationary position;
illuminating portions of the display screen from different positions on the display for each of the more than one image;
detecting changes in light patterns and/or reflections between each more than one image;

producing a three dimensional (3D) image of the upper torso based on the detected changes;
enhancing a bust size of the 3D image of the upper torso to produce an enhanced 3D image;
comparing the enhanced 3D image to the 3D image of the upper torso; and
producing a 3D image of the mask based on a comparison of the enhanced 3D image to the 3D image of the upper torso;
wherein the musk comprises
a difference in volume between the 3D bust size image and the 3D upper torso image;
an inner surface that conforms to the natural contours of the user's body; and
an outer surface that conforms to the contours of the enhanced 3D image.

16. The method of claim 15, further comprising:
including an object of known dimensions in the captured more than one image; and
producing the 3D image of the mask with actual dimensions based on reference to the object on known dimensions.

17. The method of claim 15, further comprising:
inserting the mask in a bra-like device to be worn by the user.

* * * * *